United States Patent
Hechler-Stabbert et al.

(10) Patent No.: US 8,529,361 B2
(45) Date of Patent: Sep. 10, 2013

(54) DRIVE SHAFT, IN PARTICULAR RADIAL SHAFT FOR A GAS-TURBINE ENGINE

(75) Inventors: Gerald Hechler-Stabbert, Berlin (DE); Alexander Pabst, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 13/269,973

(22) Filed: Oct. 10, 2011

(65) Prior Publication Data

US 2012/0094777 A1 Apr. 19, 2012

(30) Foreign Application Priority Data

Oct. 19, 2010 (DE) .................. 10 2010 048 926

(51) Int. Cl.
*F16C 3/02* (2006.01)

(52) U.S. Cl.
USPC .................................. 464/181; 464/183

(58) Field of Classification Search
USPC .............. 464/181, 183; 138/DIG. 2
See application file for complete search history.

(56) References Cited

U.S. PATENT DOCUMENTS

| | | | |
|---|---|---|---|
| 5,222,296 A | | 6/1993 | Doorbar et al. |
| 5,731,527 A | * | 3/1998 | Van Cleve .............. 138/DIG. 2 |
| 6,287,209 B1 | * | 9/2001 | Nakajima et al. ............. 464/181 |
| 2008/0045348 A1 | * | 2/2008 | Shin ............................ 464/181 |
| 2010/0109184 A1 | | 5/2010 | Schreiber et al. |
| 2010/0113170 A1 | | 5/2010 | Schreiber et al. |
| 2010/0113171 A1 | | 5/2010 | Schreiber et al. |

FOREIGN PATENT DOCUMENTS

| | | |
|---|---|---|
| DE | 102008056017 | 5/2010 |
| DE | 102008056018 | 5/2010 |
| EP | 1083345 | 3/2001 |
| EP | 1939395 | 7/2008 |

* cited by examiner

*Primary Examiner* — Gregory Binda
(74) *Attorney, Agent, or Firm* — Timothy J. Klima; Shuttleworth & Ingersoll, PLC

(57) ABSTRACT

A drive shaft, in particular a radial shaft for a gas-turbine engine, includes a metallic and hollow shaft shank 1 with load transfer elements 2, 10, 11 integrally formed onto its ends. The shaft shank 1 includes a metal tube 3, 9 prefabricated as a semi-finished part, designed only for transmission of torsional loads and having a constant wall thickness. An outer or inner reinforcement 5, 8 intended only for ensuring the necessary bending stiffness is provided on the outer and/or inner circumferential surface of the metal tube 3, 9 and made from a fiber-composite layer 13, 13' with fibers oriented in the longitudinal direction of the drive shaft. The inner fiber-composite layer 13 acting as outer reinforcement 5 is sheathed with an outer fiber-composite layer 14 made from fibers oriented at an angle of 60° to 90° relative to the longitudinal direction.

18 Claims, 4 Drawing Sheets

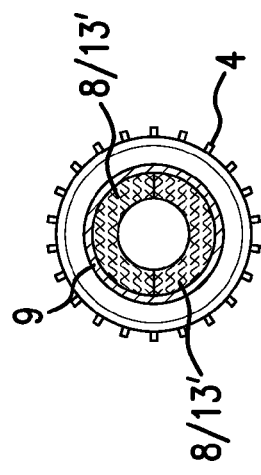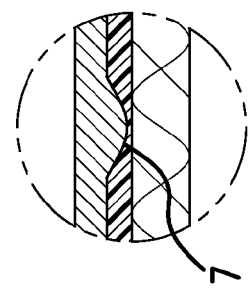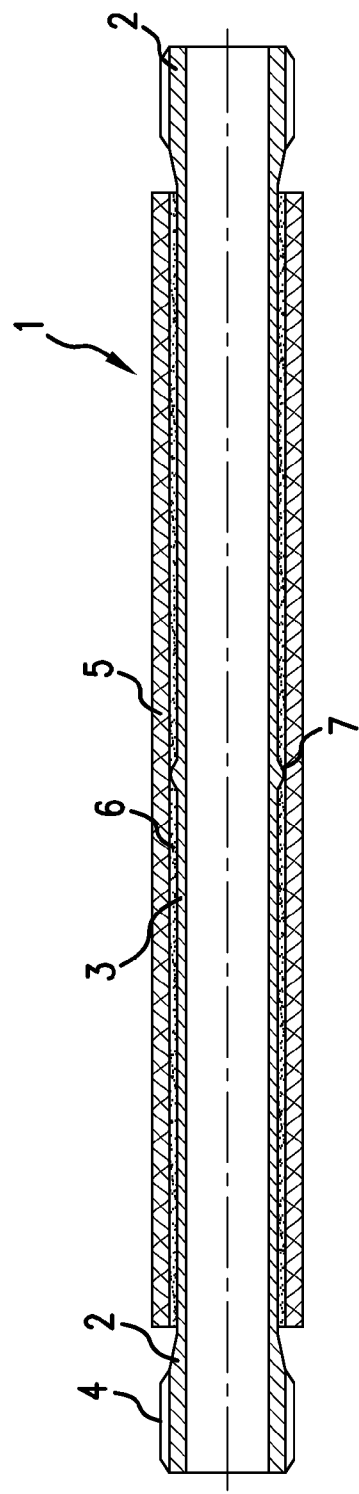

DRIVE SHAFT, IN PARTICULAR RADIAL SHAFT FOR A GAS-TURBINE ENGINE

Figure 1:
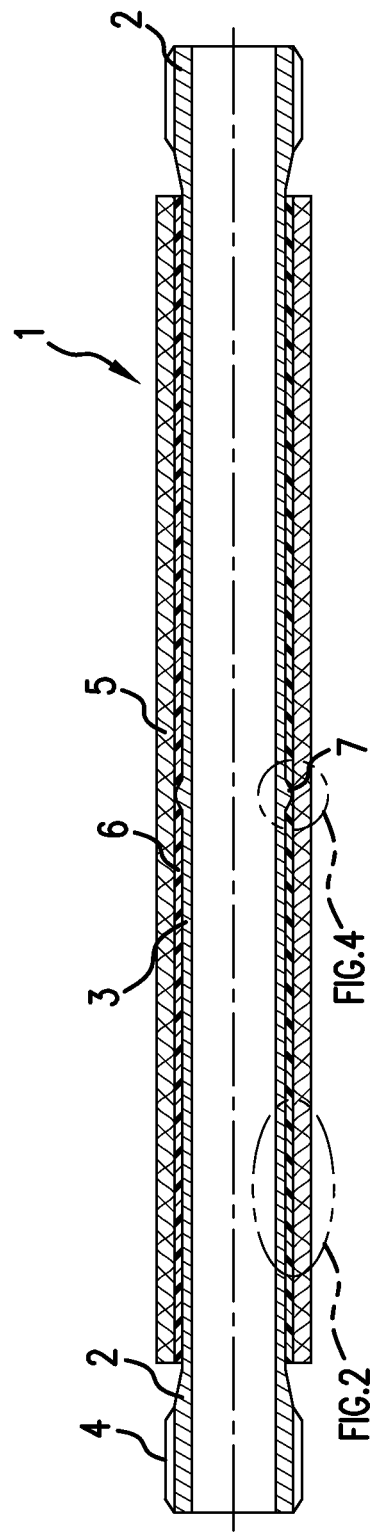

This application claims priority to German Patent Application DE102010048926.3 filed Oct. 19, 2010, the entirety of which is incorporated by reference herein.

This invention relates to a high-speed drive shaft, in particular to a radial shaft for a gas-turbine engine, including a metallic and hollow shaft shank with load transfer elements integrally formed onto its ends.

The radial shaft of a gas-turbine engine provided for driving a generator is usually designed as hollow-bored and honed metallic component with load transfer elements integrally formed onto its two ends. The connection to the engine or the generator, respectively, is made via the load transfer elements, for example provided with toothing, with the interconnection of a transmission. The manufacture of the known metallic radial shafts for gas-turbine engines involves heavy cost, since their tube cross-section varies to achieve a high bending stiffness and a correspondingly high critical bending speed, requiring expensive boring and honing processes. To minimize production-related imbalances and the bending stresses involved, high-precision and hence expensive balancing is also necessary. In addition, the high costs set limits on the frequently desired use of radial shafts at higher operating speed and/or with greater length and also with correspondingly higher bending stiffness and critical bending speed.

The suggestion has already been made to produce the radial shaft of gas-turbine engines completely from fiber-composite material or in a hybrid design using a tube made of fiber-composite material with metallic load transfer elements attached to its ends. However, an effective increase of the critical bending speed is not assured due to the reduced bending stiffness compared with a radial shaft made of metal. In addition, the torsional loads that are effective particularly in the area of the load transfer lead to critical stress conditions in the fiber-composite material.

The present invention, in a broad aspect, provides a radial shaft with high bending stiffness and high critical bending speed which can be produced inexpensively and operated in an increased speed range even with greater length.

The underlying idea of the invention is to provide for decoupling of the torsional load transmission and flexural stiffening of the drive shaft in that the shaft shank provided at the ends with load transfer elements includes a metal tube prefabricated as a semi-finished part, designed only for transmission of torsional loads and having a constant wall thickness, and an outer or inner reinforcement intended only for ensuring the necessary bending stiffness on the outer or inner circumferential surface of the metal tube and made from a fiber-composite layer with fibers oriented in the longitudinal direction of the drive shaft, where the fiber-composite layer acting as the outer reinforcement is sheathed with an outer fiber-composite layer made from fibers oriented at an angle of 60° to 90° relative to the longitudinal direction.

The high-speed drive shaft thus formed and intended in particular as a radial shaft for a gas-turbine engine can be manufactured at low cost. The outer or inner reinforcement made of fiber-composite material for the metal tube designed only for torque transmission and hence slender ensures such a high flexural stiffening that longer drive shafts with higher operating speed can be used thanks to a resultant significant increase in the critical bending speed at the same torque. Its use as a radial shaft thus results in new possibilities for engine design.

In a further embodiment of the present invention, the fiber-composite layer formed out of axially oriented fibers is made of fiber-composite material compressed into half-shells, so that a high fiber density and hence an even higher bending stiffness can be achieved.

An intermediate layer designed as a sliding layer to compensate for heat-related longitudinal expansions is provided between the metal tube and the fiber-composite layer contacting the metal tube. The intermediate layer can also be designed as an adhesive layer, as an elastic layer and/or as a corrosion-preventing layer.

In accordance with yet another feature of the invention, the inner fiber-composite layer of the outer reinforcement is fixed in the longitudinal direction by a positioning ring provided centrally on the outer circumference of the metal tube.

In a further embodiment of the invention, the fiber-composite layer acting as inner reinforcement is fixed by covers fitted on both sides inside the metal tube which at the same time prevent any passage of liquid through the metal tube and protect the fiber-composite layer from external effects.

The fiber-composite layers are made of, in an advantageous embodiment of the invention, glass, carbon and/or aramide fibers embedded into a polymer matrix.

In a further embodiment, the metal tube is designed as a straight or conically tapering tube of circular cross-section.

The load transfer elements, for example provided with outer toothing, are preferably produced separately and connected to the ends of the metal tube by welding, in particular friction welding.

Figure 2:
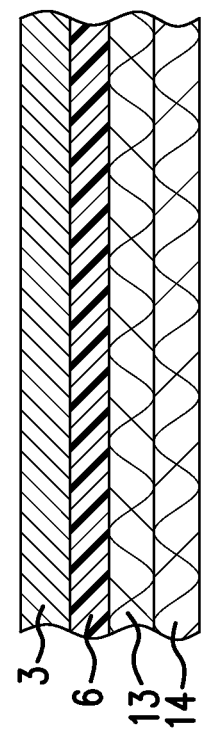
Figure 2A:
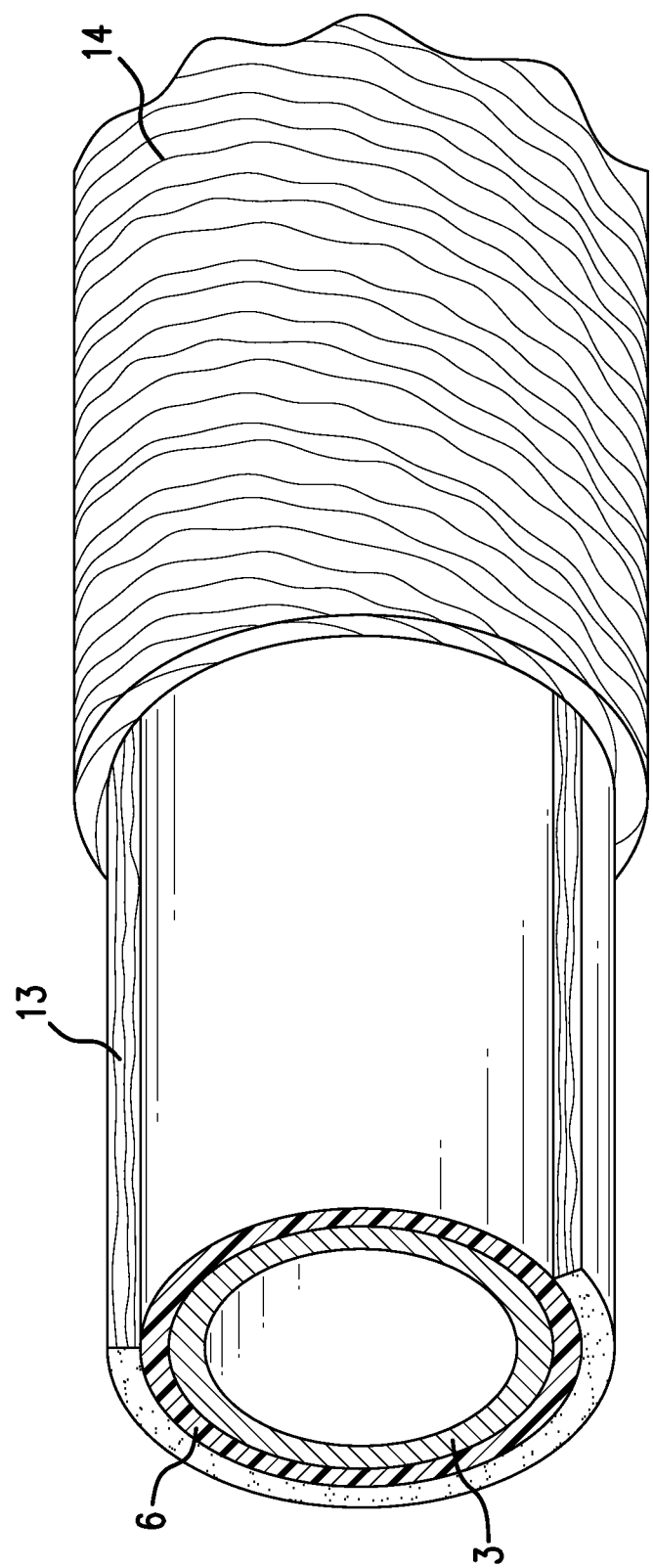
Figure 3:
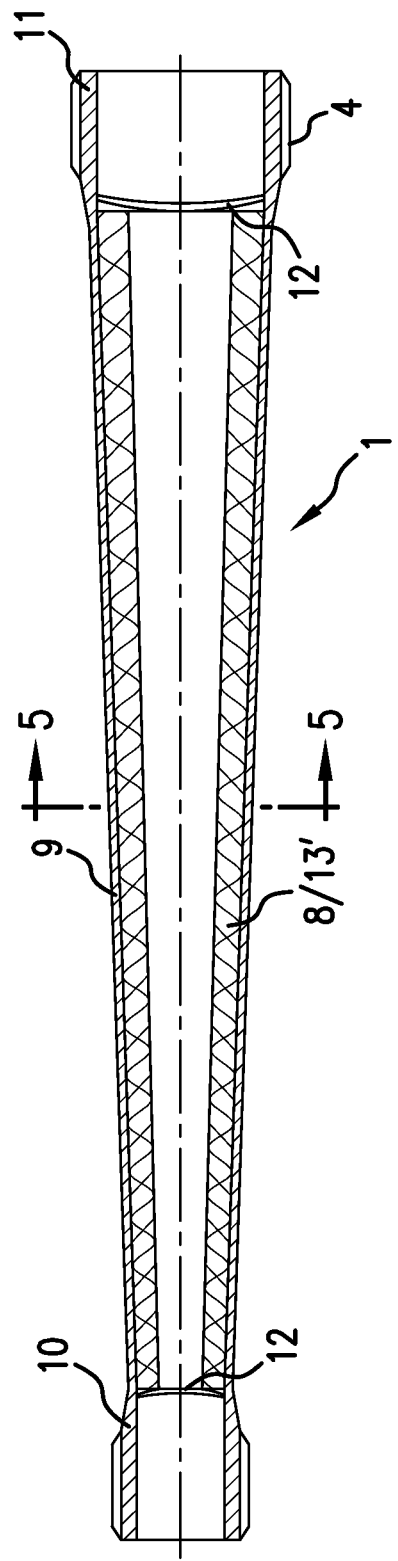

The present invention is more fully described in light of the accompanying drawings showing preferred embodiments. In the drawings, FIG. 1 shows a longitudinal section of a radial shaft of the metal/fiber-composite/hybrid design with an outer fiber-composite reinforcement for a gas-turbine engine, FIG. 2 shows an enlarged sectional view of a wall section of the radial shaft as per FIG. 1, FIG. 2A shows a partial cut-away view of the radial shaft per FIG. 1, FIG. 3 shows a longitudinal section of a radial shaft of the hybrid design with an inner fiber-composite reinforcement in a conically designed metal tube, FIG. 4 shows an enlarged view of the positioning ring of the radial shaft of FIG. 1, FIG. 5 shows a sectional view of the radial shaft of FIG. 3 taken along section line 5-5, and FIG. 6 shows a further embodiment of the radial shaft of FIG. 1.

The radial shaft shown in FIG. 1 includes a shaft shank 1 with load transfer elements 2 provided at its ends. The shaft shank 1 includes a metal tube 3 configured as a prefabricated semi-finished part and having circular cross-section, constant wall thickness and constant diameter, onto the ends of which shank the load transfer elements 2, in this case having an outer toothing 4, are integrally formed or attached. The separately produced load transfer elements 2 are connected to the metal tube 3, which is intended only for transmitting torsional loads and has correspondingly slender dimensions, for example by friction welding. It is however also conceivable that the load transfer elements 2 are an integral part of the metal tube. The required bending stiffness of the shaft shank 1 is obtained by an outer reinforcement 5 fitted to the outer circumference of the metal tube 3 and made from an (inner) fiber-composite layer 13 with fibers oriented predominantly in the longitudinal direction of the shaft shank 1. The inner fiber-composite layer 13 of axially oriented fibers is sheathed with an outer fiber-composite layer 14 made of fibers oriented at an angle of 60° to nearly 90°, in order to prevent thereby any radial widening of the outer reinforcement 5, i.e. the inner fiber-composite layer 13, caused by bending. See FIG. 2A.

The inner fiber-composite layer 13 includes, in accordance with the present embodiment, two prefabricated half-shells (see, for example, FIG. 5) of fiber-composite material placed around the metal tube 3. The half-shells of fiber-composite material are manufactured in a compression process in a mould such that a high fiber content and hence a high stiffness can be achieved. Then the outer fiber-composite layer 14 is applied. The fiber-composite material is made of glass, carbon or aramide fibers embedded into a polymer matrix, including for example a thermoplastic or thermosetting plastic. Between the outer reinforcement 5 and the metal tube 3 is an intermediate layer 6—of PTFE paint in the present exemplary embodiment—provided on the outer surface of the metal tube 3 in order to compensate for any thermally related longitudinal expansion of the metal tube 3. An intermediate layer 6 made of a polymer or elastomer can furthermore also have an adhesive or corrosion-preventing or elastic effect. See FIG. 6 showing such an intermediate layer 6. For fixing the outer reinforcement 5 made of fiber-composite material, the middle of the metal tube 3 is provided with a positioning ring 7 extending in its circumferential direction. See the enlarged view of the positioning ring 7 shown in FIG. 4. The previously described wall structure of a metal tube 3 forming the shaft shank 1 with outer reinforcement 5 is shown in enlarged representation in FIG. 2.

Instead of the outer reinforcement 5, an inner reinforcement 8 can also be applied to the inner circumferential surface of the metal tube 3 which is like the outer reinforcement 5—however without fiber-composite layer 14—and therefore, has a fiber-composite layer 13 with axially oriented fibres.

FIG. 3 shows a shaft shank 1 with an inner reinforcement 8 applied to the inner circumferential surface of a conically tapering metal tube 9 prefabricated as a semi-finished part. The separately produced load transfer elements 10, 11 welded to the tube ends are of differing size due to the conical design of the metal tube 9. A cover 12 held at each end of the inner reinforcement 8 inside the shaft shank 1 fixes the fiber-composite material of the inner reinforcement 8 inside the conical metal tube 9 and furthermore prevents any passage of liquid through the radial shaft and any damage that this might entail to the inner reinforcement 8 made of the fiber-composite layer 13'. The inner reinforcement 8 with fiber composite layer 13 can be provided as two prefabricated half-shells as shown in FIG. 5.

Thanks to the formation of the previously described radial shaft from a prefabricated simple metal tube as a semi-finished part and from an outer or inner reinforcement, respectively, of fiber-composite material, and also thanks to the expensive balancing measures required for conventional radial shafts no longer being needed, the costs of manufacture are low. The metal tube is designed only for the transmission of torsional loads and has a correspondingly low mass and comparatively low diameter, whereas the bending stiffness required for a high speed is assured by the inner or outer reinforcement consisting of lightweight fiber-composite material. Thanks to the resultant significant increase in the critical bending speed, it is possible to manufacture also longer radial shafts inexpensively and in addition to operate them at higher speeds. For example, a radial shaft of 0.5 m length previously operated with 15,000 to 25,000 revolutions per second can in the embodiment described above be designed twice as long and operated at a speed of up to 45,000 revolutions per second.

LIST OF REFERENCE NUMERALS

1 Shaft shank
2 Load transfer elements of 3
3 Metal tube of 1
4 Outer toothing of 2, 10, 11
5 Outer reinforcement of 3
6 Intermediate layer
7 Positioning ring
8 Inner reinforcement of 9
9 Conically tapering metal tube
10 Load transfer element of 9
11 Load transfer element of 9
12 Cover of 9
13, 13' inner fiber-composite layer of 5 or 8, respectively
14 Outer fiber-composite layer

What is claimed is:
1. A drive shaft, comprising:
a metallic and hollow shaft shank having load transfer elements integrally formed onto its ends, the shaft shank including:
a metal tube prefabricated as a semi-finished part, configured for transmission of torsional loads and having a constant wall thickness, and
a reinforcement layer positioned on an exterior of the metal tube configured for ensuring a bending stiffness on the surface of the metal tube, the reinforcement layer having an inner fiber-composite layer with fibers oriented in a longitudinal direction of the drive shaft,
wherein, the reinforcement layer includes an outer fiber-composite layer having fibers oriented at an angle of 60° to 90° relative to the longitudinal direction;
an intermediate layer provided between the metal tube and the inner fiber-composite layer;
wherein the intermediate layer is configured as a sliding layer to compensate for heat-related longitudinal expansions.

2. The drive shaft of claim 1, wherein the intermediate layer is configured as at least one chosen from an elastic layer and a corrosion-preventing layer.

3. The drive shaft of claim 1, and further comprising a radially projecting positioning ring provided centrally on the outer circumference of the metal tube for fixing the inner fiber-composite layer in a longitudinal direction on the exterior of the metal tube.

4. The drive shaft of claim 1, and further comprising covers fitted on both sides inside the metal tube for fixing the inner fiber-composite layer in a longitudinal direction on the interior of the metal tube while also sealing the metal tube to prevent passage of liquid through the metal tube and protect the inner fiber-composite layer from external effects.

5. The drive shaft of claim 1, wherein the metal tube is configured as one chosen from a straight and a conically tapering tube of circular cross-section.

6. The drive shaft of claim 1, and further comprising separately produced load transfer elements connected to ends of the metal tube by welding.

7. The drive shaft of claim 1, wherein the drive shaft is a radial shaft for a gas-turbine engine.

8. A drive shaft, comprising:
a metallic and hollow shaft shank having load transfer elements integrally formed onto its ends, the shaft shank including:
a metal tube prefabricated as a semi-finished part, configured for transmission of torsional loads and having a constant wall thickness, and a reinforcement layer positioned on an interior of the metal tube configured for ensuring a bending stiffness on the surface of the metal tube, the reinforcement layer having an inner fiber-composite layer with fibers oriented in a longitudinal direction of the drive shaft;

an intermediate layer provided between the metal tube and the inner fiber-composite layer;

wherein the intermediate layer is configured as a sliding layer to compensate for heat-related longitudinal expansions.

9. The drive shaft of claim 8, wherein the inner fiber-composite layer is made of fiber-composite material compressed into half-shells.

10. The drive shaft of claim 8, wherein the intermediate layer is configured as at least one chosen from an elastic layer and a corrosion-preventing layer.

11. The drive shaft of claim 8, and further comprising covers fitted on both sides inside the metal tube for fixing the inner fiber-composite layer in a longitudinal direction on the interior of the metal tube while also sealing the metal tube to prevent passage of liquid through the metal tube and protect the inner fiber-composite layer from external effects.

12. The drive shaft of claim 8, wherein the metal tube is configured as one chosen from a straight and a conically tapering tube of circular cross-section.

13. The drive shaft of claim 8, and further comprising separately produced load transfer elements connected to ends of the metal tube by welding.

14. The drive shaft of claim 8, wherein the drive shaft is a radial shaft for a gas-turbine engine.

15. A drive shaft, comprising:
a metallic and hollow shaft shank having load transfer elements integrally formed onto its ends, the shaft shank including:
a metal tube prefabricated as a semi-finished part, configured for transmission of torsional loads and having a constant wall thickness, and
a reinforcement layer positioned on an exterior of the metal tube configured for ensuring a bending stiffness on the surface of the metal tube, the reinforcement layer having an inner fiber-composite layer with fibers oriented in a longitudinal direction of the drive shaft,
wherein the reinforcement layer includes an outer fiber-composite layer having fibers oriented at an angle of 60° to 90° relative to the longitudinal direction;
a radially projecting positioning ring provided centrally on the outer circumference of the metal tube for fixing the inner fiber-composite layer in a longitudinal direction on the exterior of the metal tube.

16. The drive shaft of claim 15, and further comprising an intermediate layer provided between the metal tube and the inner fiber-composite layer; wherein the intermediate layer is configured as at least one chosen from an adhesive layer, an elastic layer and a corrosion-preventing layer.

17. The drive shaft of claim 15, and further comprising covers fitted on both sides inside the metal tube for fixing the inner fiber-composite layer in a longitudinal direction on the interior of the metal tube while also sealing the metal tube to prevent passage of liquid through the metal tube and protect the inner fiber-composite layer from external effects.

18. The drive shaft of claim 15, wherein the metal tube is configured as one chosen from a straight and a conically tapering tube of circular cross-section.

* * * * *